United States Patent [19]

Quinlan et al.

[11] Patent Number: 4,743,481
[45] Date of Patent: May 10, 1988

[54] MOLDING PROCESS FOR ARTICLES HAVING AN IRREGULAR SHAPED INTERNAL PASSAGE

[75] Inventors: James T. Quinlan, Massillon; James I. Seeley, New Philadelphia, both of Ohio; Christopher H. Corbett, Auburn Hts., Mich.; Thomas A. Marcincavage, Guernsey, Ohio

[73] Assignee: Flex Technologies, Inc., Midvale, Ohio

[21] Appl. No.: 937,117

[22] Filed: Nov. 26, 1986

[51] Int. Cl.$^4$ .................... B28B 7/18; B29C 63/44
[52] U.S. Cl. ..................... 428/36; 428/542.8; 264/221; 264/259; 264/317
[58] Field of Search ............... 428/36, 542.8; 264/221, 264/271.1, 259, 317, DIG. 44

[56] References Cited

U.S. PATENT DOCUMENTS

| 2,569,935 | 10/1951 | Leguillon et al. | |
|---|---|---|---|
| 2,995,781 | 8/1961 | Sipler | 264/313 |
| 3,719,735 | 3/1973 | Valyi . | |
| 3,929,954 | 12/1975 | Valyi . | |
| 3,991,146 | 11/1976 | Barrie . | |
| 4,239,568 | 12/1980 | Takazawa | 264/221 |
| 4,289,817 | 9/1981 | Valyi . | |
| 4,314,964 | 2/1982 | Ferrary . | |
| 4,352,772 | 10/1982 | Bezner . | |
| 4,424,183 | 1/1984 | Nelson | 264/221 |
| 4,464,324 | 8/1984 | Hager | 264/221 |
| 4,515,842 | 5/1985 | Kovacs | 428/36 |

FOREIGN PATENT DOCUMENTS 2260433  9/1975  France ................. 264/317

Primary Examiner—John E. Kittle
Assistant Examiner—Beth A. Bozzelli
Attorney, Agent, or Firm—Michael Sand Co.

[57] ABSTRACT

A process for making an article having an irregular internal passage utilizes a hollow polymer preform. The preform is filled with a relatively incompressible filler material such as a powder or a fluid, which supports the preform when it is placed in a mold, e.g. an injection mold. The filler enables the preform to withstand high molding pressures and prevents deflection and movement of the internal passage within the preform. The shell, a layer of a polymer material is then molded about the preform. After the final article has been formed, consisting of the preform and shell, the filler is removed for possible reuse.

16 Claims, 3 Drawing Sheets

MOLDING PROCESS FOR ARTICLES HAVING AN IRREGULAR SHAPED INTERNAL PASSAGE

FIELD OF THE INVENTION

The present invention relates to a process for molding an article having an irregular internal passage by utilizing a polymer preform. More specifically, the present invention relates to a process wherein a preform is provided having the desired internal surface or passage and is filled with a generally incompressible material which resists high molding pressure during the molding of a shell of a polymer material thereabout, preferably a thermoplastic, in forming the final article.

BACKGROUND OF THE INVENTION

Heretofore, unless the internal portion of a molded article contained regular surfaces, that is, surfaces wherein a core could be readily removed after the molding of an article, special molding techniques were required. One method utilized to mold an article having an irregular internal surface was the "lost core" method wherein metal or salt was formed in the same shape as the desired internal passage or irregular surface. The article was then molded around the "lost core". To remove the irregular internal core, the metal or salt was generally melted or dissolved by utilizing various solvents and/or heat. This process destroyed the core.

A second method is the epoxy-sand matrix method wherein a rigid epoxy-sand matrix core is utilized to form the irregular internal shape. After the article was molded or cast, the core was destroyed and removed from the article.

U.S. Pat. No. 2,569,935 to Leguillon, et al, relates to the manufacture of composite articles having a fabricated portion of fabric, cords, and the like, and a body of a rubber-like material bonded thereto. An expansible bag is utilized as a core in the interior portion of a mold so that a tire can be molded thereabout. The inflated bag supports the tire during molding, after which it is deflated and the tire removed.

U.S. Pat. No. 3,719,735 to Valyi relates to a method for pressure molding a parison which is subsequently blow molded. A relatively thin sleeve of plastic corresponding to the shape of the blow core is placed over the blow core prior to molding the parison therearound to insulate the blow core from the temperature of the molten plastic so that a blow valve is protected from clogging and the blow core is protected from erosion during the molding step.

U.S. Pat. No. 3,929,954 to Valyli relates to a method for the production of injected blow molded containers having a preformed inner lining which is applied to the core of the injection molding tool without immediately direct contact with the heated portions of the core.

U.S. Pat. No. 3,991,146 to Barrie relates to encapsulating an insert in plastic by injection molding with one face of the insert bearing against the mold thus supporting the insert against movement during injection and with subsequent relative movement between the insert and the supporting mold face to allow the injected material to float around the face of the insert.

U.S. Pat. No. 4,289,817 to Valyi relates to lined articles having an outer plastic layer of transparent or translucent plastic and a decorated inner plastic layer so that the decoration is visible through the outer layer. The article is prepared by decorating a plastic liner and molding a transparent or translucent plastic around the decorated liner.

U.S. Pat. No. 4,314,964 to Ferrary relates to a method of injection molding an article wherein an inflatable inner sleeve is utilized to form the internal shape of the molded article.

U.S. Pat. No. 4,352,772 to Bezner relates to the plastic injection molding of a manifold in which a first part is made by an extrusion followed by the injection molding of the plastic over the extrusion. A core is used and defines a shape of the internal space of the final manifold.

The above patents do not disclose the molding of an article having an irregular internal surface or passage by utilizing a polymer, preferably a thermoplastic preform or the utilization of a generally incompressible material within the preform during molding of the article.

SUMMARY OF THE INVENTION

Accordingly, it is an aspect of the present invention to provide a process for readily molding an article having an irregular internal geometric surface or passage wherein the article is readily formed utilizing a relatively inexpensive method. An article having good quality molding features is produced and the process is readily repeatable. The process utilizes a polymer hollow preform which can be made in any conventional manner as by blow molding, extrusion followed by mechanical forming, compression molding, injection molding, and the like. The preform material desirably has high heat resistance and low shrink properties. A relatively incompressible material such as a powder, liquid or other type of a fluid, preferably is placed within the preform that is placed within a mold and a polymer shell molded thereabout to form the final article. Since the filler material is relatively incompressible, the high pressure generated during forming of the article has relatively no effect, if any, upon the shape of the preform. After molding, the incompressible material is removed and the preform remains with the shell as an integral part of the final article.

In general, a process for molding an article having an irregular internal geometry or passage comprises the steps of fabricating at least one polymer preform having a hollow interior or irregular internal geometry, a filling said preform with a relatively incompressible material, placing said filled preform into a mold, and molding a layer of a polymer about said preform in said mold to form a shell surounding the preform to form the article.

DESCRIPTION OF THE INVENTION

The present invention generally relates to a relatively inexpensive and basic process for molding an article wherein irregular internal surfaces or passages are involved. The existence of such irregular internal surfaces or hollow passages heretofore required that any internal core be destroyed in forming the final article. A preform which forms the desired internal geometry or passage in the present invention, in contrast, is not destroyed or removed and becomes an integral part of the final product.

The initial step of the present process is the formation of a preform. At least one preform is fabricated from a polymer, preferably a thermoplastic material. The preform can be fabricated in any conventional manner as by injection molding, compression molding, extrusion followed by mechanical forming, blow molding, and the like. Thus, a hollow preform having a desired irregular internal surface therein, such as various complicated shaped passages is produced. A plurality of various different preforms can be made and subsequently utilized together in order to form the final article.

Figure 1:
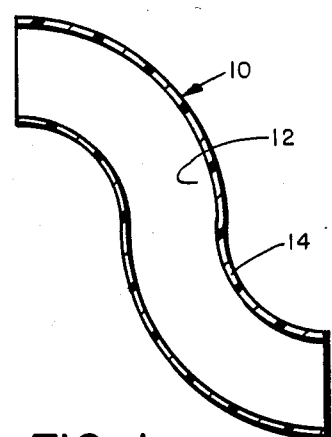
FIG. 1 is a cross-sectional view of a preform according to the present invention.

While the present invention generally relates to any article moldable from a polymer material having a complicated internal passage, the invention will be discussed initially with regards to a preferred embodiment of a manifold, such as a section of an intake manifold of an automobile engine formed of a thermoplastic material, and then to a complete intake manifold. Referring to FIG. 1, a thermoplastic preform made according to any conventional manner as noted in the preceeding paragraph, is generally indicated by the numeral 10. The preform has an irregular internal passage of the intake manifold, which can be described as a reverse curve and is indicated at 12, formed by a similarly shaped wall 14.

Figure 4:
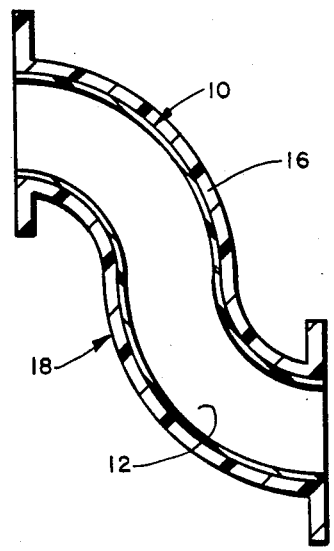
FIG. 4 is a cross-sectional view showing the shell molded about the preform.

The polymer material utilized to form the hollow preform and a shell 16 thereabout, (FIG. 4), in the formation of an intake manifold section, indicated generally at 18, FIG. 4, can be any conventional polymer which has good stability, that is, high heat resistance as from about 250° F. to about 350° F. or higher, and low shrinkage, and preferably will be a thermoplastic material. Examples of suitable materials include nylon, liquid crystal polymers, polymide-imide, polysulfone, polyphenylene sulfide, polyetheretherketone, and the like. A preferred thermoplastic material are the various liquid crystal polymers so called since in their melt stage they contain various amounts of crystalline structure. The liquid crystal polymers can be described as anisotropic aromatic polyesters. Such compounds are manufactured by Dart-Kraft under the Trademark Zydar and by Celanese under the Trademark Vectra.

Once the hollow preform having an irregular internal geometry such as reverse curve passage 12 has been formed, it preferably is filled with a relatively incompressible material. The filler material indicated generally at 20, can be a fluid or powder. Although not incompressible, compressed air can be used for certain applications wherein the preform is relatively strong and the molding pressures low, so long as the air sufficiently permits the preform to resist collapsing under the pressures normally associated with forming the shell about the preform. These pressures are normally on the order of from about 5,000 to about 10,000 psi.

Any conventional filler material 20 can be utilized as is well known to the art and to the literature. Specific examples of incompressible fluids or powders which can be utilized in the interior loading of the preforms include water, various oils, or fluids, magnesium oxide, silicon dioxide, air, and the like. The filler material is usually of a size and nature such that any force exerted thereon is generally transferred equally throughout the material against the preform. Hence, the filler enables the preform to resist collapsing from molding pressures so that any deflection or movement of the preform is abated or eliminated. The term "incompressible" does not require absolute incompression features, but possesses the necessary characteristics to prevent the preform from collapsing when molding the shell thereabout.

Figure 2:
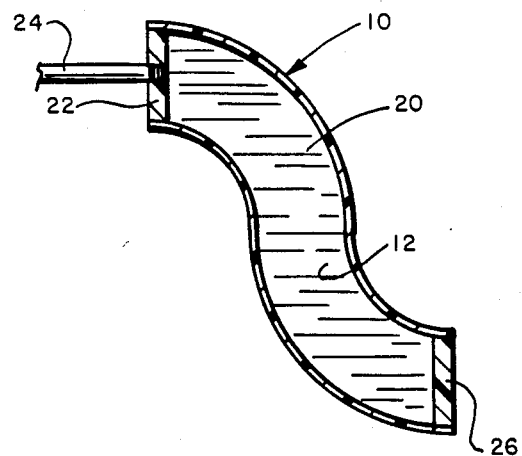
FIG. 2 is a cross-sectional view of a preform, as in FIG. 1, filled with an incompressible material and having the ends of the core plugged.

As seen in FIG. 2, one end of the preform can be capped as with a plug 22 in any conventional manner. Hollow preform 10 is then filled with the filler material which can be fed into passage 12 through a pipe or conduct 24 which is connected to an opening in plug 22. The remaining end of the preform is sealed or capped by another end cap 26 in a manner such that filler 20 is firmly compacted, if a powder, or completely fills passage 12 if a liquid. Plugs 22 and 26 can be fastened in any conventional manner as through a frictional engagement, a threaded engagement, a mechanical engagement, or the like.

The preform containing filler 20 then is placed or loaded into a mold 28 for the formation of shell 16, that is, for application of a covering of polymer material over preform 10 to form the desired article or manifold section 18, FIG. 4. Mold 28 can have any suitable mold cavity 34 and preferably is an injection mold. The operation will be briefly described herein since a conventional molding procedure is utilized as known to the art and to the literature. Mold 28 has a plurality of matingly engaging parts as for example two. The filled preform is placed into one portion of the mold and the other parts assembled thereon. The mold is then closed. Alterations to a conventional mold may include adding various pins to prevent deflection or movement of the preform due to the injection pressure. If desired, the preform can be placed in the mold and then filled with filler 20 without effecting the concept of the invention.

Figure 3:
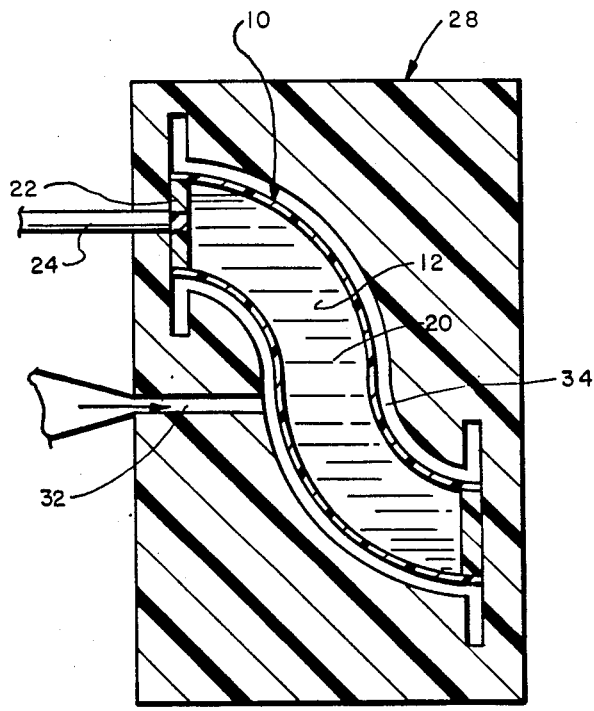
FIG. 3 is a diagraphical cross-sectional view of the filled preform residing within a mold so that a polymer shell can be molded thereabout.

As shown in FIG. 3, the plastic material is injected into one portion of the mold cavity through an orifice 32 whereupon it fills cavity 34 which is generated by the space between the external surface of preform 10 and the internal surface of mold 28. Naturally, the mold has exit ports so that the air can be expelled from the cavity as well as excess injected polymer. The injection pressure is any suitable or conventional pressure normally utilized and, as noted, is often on the order of from 5,000 to about 10,000 psi. Once article 18 has been molded, the polymer is allowed to cool, and hence solidify, whereupon article 18 consisting of preform 10 and shell 16, and still containing filler 20 is removed from the mold. Plugs 22 and 26 are removed from the preform and the filler material removed therefrom. If desired, the filler material can be recycled and hence utilized in filling other preforms. The molding of the polymer into mold cavity 34 forms an outer layer or shell 16 on the preform which then becomes the desired article 18. It is a critical aspect of the present invention that the preform is retained as an integral part of the end product or article 18. In other words, the preform is not disposed or destroyed as in prior molding methods.

The plastic utilized to form the shell can be a variety of plastics or polymers known to the art and to the literature and is the same or similar to the various materials described above which can be used to form preform 10.

Considering a modification to the preferred embodiment of the present invention, a final article 30 is shown as a complete intake manifold which is formed by a pair of ports or intake manifold sections 38 and 40 each having the irregular internal surface or passages and which were formed by the improved process described above with respect to article 18.

Figure 5:
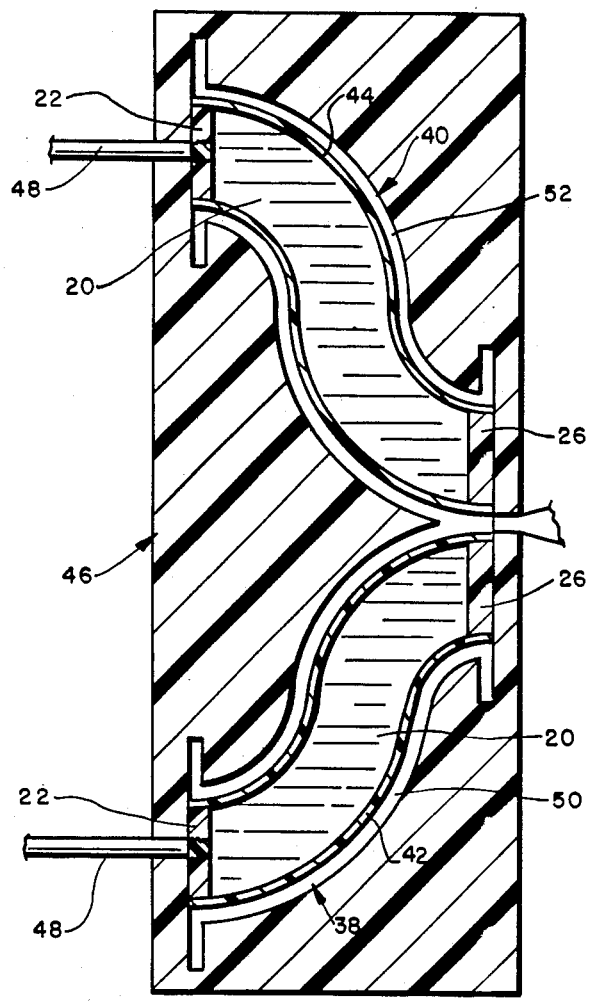
FIG. 5 is a diagraphical view similar to FIG. 3 showing the molding of an article containing two separate preforms therein with each preform having a slightly different shape.

If desired, more than two preforms can be utilized to form the final article having a plurality of different internal shapes or passages therein. Intake manifold 30 having two ports 38 and 40, each of a different configuration, is shown in FIG. 5. Preforms 42 and 44 for both ports 38 and 40, respectively, can be prepared in a manner as set forth hereinabove as by fabricating the polymer preform, filling the preform with filler 20, plugging the same, and placing the filled preform in the mold. Preform 42 of the lower intake port 38 is of slightly different configuration than preform 44 of upper port 40. However, it is made in a similar manner.

Figure 6:
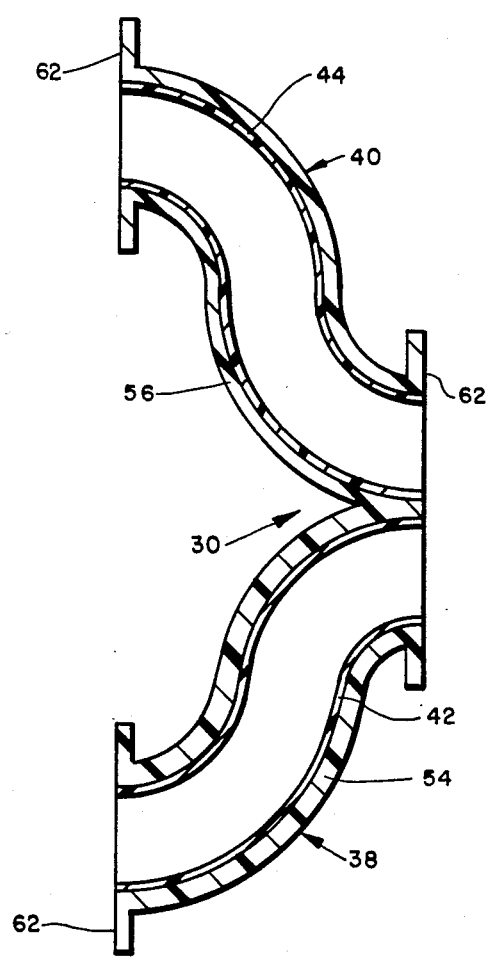
FIG. 6 is a cross-section view showing the shell applied to the preforms of FIG. 5.
Figure 7:
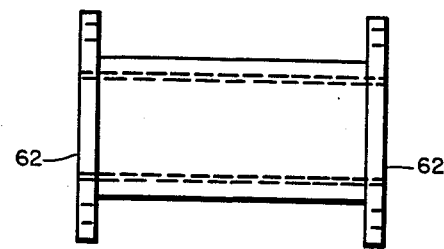
FIG. 7 is an end view looking in the direction of arrows 7—7, FIG. 9.
Figure 8:
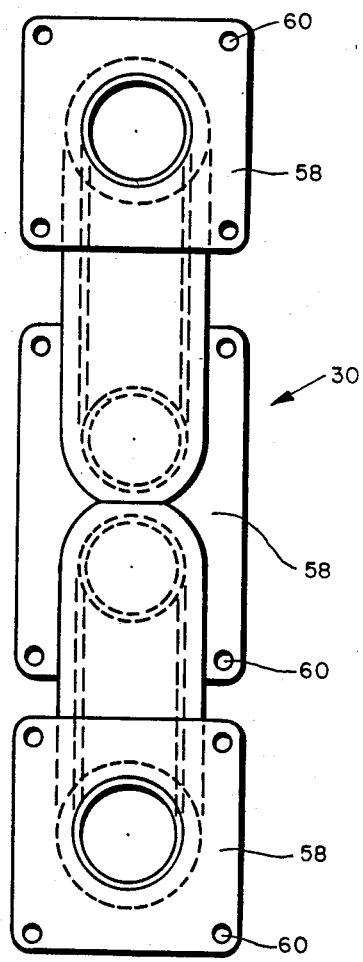
FIG. 8 is a top elevational view showing the molded article of FIG. 6.
Figure 9:
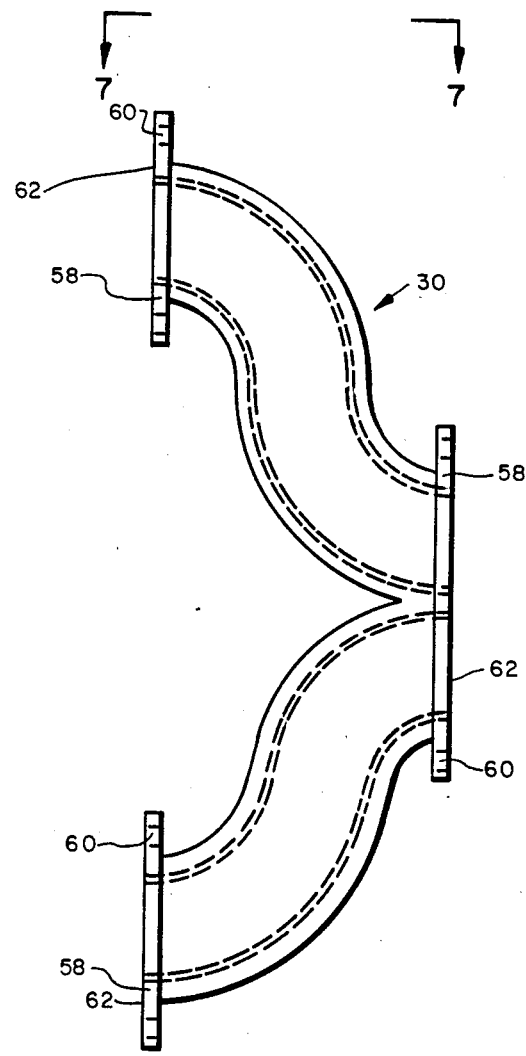
FIG. 9 is a side elevational view showing the molded article of FIG. 6.

Preforms 42 and 44 are placed in a mold 46 (FIG. 5) and may still include filler conduits 48 as a part thereof, or they may be removed therefrom without effecting the concept of the invention. A polymer, as also set forth hereinabove, is then injected into cavities 50 and 52 formed between preforms 42 and 44 and the surfaces of mold 46 to form shells 54 and 56 about the preforms. As shown in FIG. 5, the upper manifold port and the lower manifold port are integrally molded to form one article, namely, intake manifold 30. After the polymer has been allowed to solidify as by cooling, the mold is opened, the various plugs removed, and the filler material removed from the preforms. The net result is a dual port intake manifold as shown in FIG. 6 wherein preforms 42 and 44 are an integral part of the final article. The article is further shown in FIGS. 7, 8, and 9 which set forth various features thereof such as end flanges 58 containing bolt apertures 60 therein and the various sealing surfaces 62.

It can thus be seen that from the above description that numerous articles having complex, complicated, or irregular internal passages surfaces can be readily made according to the present invention. Moreover, once the article has been fabricated, the filler material is simply removed therefrom and no destruction of the preform is required. The process of the present invention can be utilized to generally form any object or article as commonly or conventionally made through the use of aluminum sand castings. Generally any die casting, various small engine components, various housing for pumps and the like which are cast, can be readily made by the present process.

Once the article has been formed, various post finishing operations of the plastic or the thermoplastic molding can be carried out such as removal of any flashing, the tapping of holes, as well as any reaming and boring operations.

Accordingly, the improved molding process is simplified, provides an effective, safe, inexpensive, and efficient method which achieves all the enumerated objectives, provides for eliminating difficulties encountered with prior methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved molding process is carried out, the characteristics of the process, and the advantageous, new and useful results obtained; the new and useful structures, devices, elements, arrangements, parts, and method steps, are set forth in the appended claims.

What is claimed is:

1. A process for forming a complex article having a plurality of irregular internal passages, comprising the steps of:

fabricating a plurality of polymer preforms each having an internal passage;

assembling said preforms into a final configuration;

placing said assembled preforms into a mold, and molding a layer of a polymer material about said assembled preforms in said mold to form a shell on the assembled preforms and form said complex article, with said preforms remaining as an integral part thereof and defining said internal passages.

2. A process according to claim 1, including injection molding said shell on the assembled preforms to form said article.

3. A process according to claim 1, including filling said preforms with a filler material before molding the layer of polymer material about said preforms.

4. A process according to claim 2, wherein the filler material is a relatively incompressible material.

5. A process according to claim 3, wherein said incompressible material is a powder.

6. A process according to claim 3, wherein said incompressible material is a liquid.

7. A process according to claim 3, including applying said incompressible material in such a manner to said preforms so that any pressure applied to said preforms during molding of the shell is substantially and equally distributed throughout said preform to prevent deformation of the preform.

8. A process according to claim 4, including removing said complex article from said mold and removing said incompressible material from said preforms.

9. A process according to claim 4, wherein said polymer molding material is a thermoplastic, and wherein said thermoplastic material has a high heat resistance temperature and low shrinkage.

10. A process according to claim 5, wherein said thermoplastic preforms have good heat resistance at a temperature of at least 250° F., and wherein said preform thermoplastic is a liquid crystal polymer.

11. A molded plastic article having a complex internal passage made by the steps comprising:

forming a plurality of thermoplastic preforms having internal surfaces which when combined substantially match the complex internal passage of the article;

loading said plurality of preforms in a predetermined pattern into a mold with said internal surfaces forming said complex internal passage;

molding a plastic material on said preform; and forming said article having said preforms remaining as an integral part thereof whereby said internal surfaces of the preforms form said internal passage of the molded article.

12. A molded article according to claim 11 wherein an incompressible material is loaded into the preforms so that said preforms resist molding pressure during molding.

13. A molded article according to claim 12, wherein said incompressible material is a powder or a liquid.

14. A molded article according to claim 12, wherein said thermoplastic preform has a high heat resistance and low shrinkage.

15. A molded article according to claim 13, wherein said mold is an injection mold, and including injection molding of said plastic material into said injection mold.

16. A molded article according to claim 14, wherein said thermoplastic preform material is a liquid crystal polymer.

* * * * *